United States Patent
Burnette et al.

(10) Patent No.: US 7,244,946 B2
(45) Date of Patent: Jul. 17, 2007

(54) FLAME DETECTOR WITH UV SENSOR

(75) Inventors: Stanley D. Burnette, Colorado Springs, CO (US); Matthew J. Buchholz, Canon City, CO (US); Richard Kwor, Colorado Springs, CO (US); Kenneth J. Mott, Colorado Springs, CO (US)

(73) Assignee: Walter Kidde Portable Equipment, Inc., Mebane, NC (US)

( * ) Notice: Subject to any disclaimer, the term of this patent is extended or adjusted under 35 U.S.C. 154(b) by 117 days.

(21) Appl. No.: 11/123,872

(22) Filed: May 6, 2005

(65) Prior Publication Data

US 2005/0247883 A1    Nov. 10, 2005

Related U.S. Application Data

(60) Provisional application No. 60/569,102, filed on May 7, 2004.

(51) Int. Cl.
*G01J 1/42* (2006.01)

(52) U.S. Cl. .................................................. 250/372

(58) Field of Classification Search ................. 250/372
See application file for complete search history.

(56) References Cited

U.S. PATENT DOCUMENTS

| | | | |
|---|---|---|---|
| 3,344,302 A | * | 9/1967 | Engh et al. ................. 313/538 |
| 4,016,424 A | | 4/1977 | Traina |
| 4,195,288 A | * | 3/1980 | Morton .................... 340/539.1 |
| 4,280,184 A | | 7/1981 | Weiner et al. |
| 4,415,264 A | | 11/1983 | Wittmer |
| 4,529,881 A | | 7/1985 | Ceurvels et al. |
| 4,533,834 A | | 8/1985 | McCormack |
| 4,578,583 A | | 3/1986 | Ciammaichella et al. |
| 4,591,725 A | | 5/1986 | Bryant |
| 4,603,255 A | | 7/1986 | Henry et al. |
| 4,616,138 A | | 10/1986 | Yuchi |

(Continued)

OTHER PUBLICATIONS

"Flame Sensor UV TRON® R2868. Quick Detection of Flame from Distance, Compact UV Sensor with High Sensitivity and Wide Directivity, Suitable for Flame Detectors and Fire Alarms," Hamamatsu Photonics K.K, 2 pages (Mar. 1998).

(Continued)

*Primary Examiner*—David Porta
*Assistant Examiner*—Marcus Taningco
(74) *Attorney, Agent, or Firm*—Merchant & Gould P.C.

(57) ABSTRACT

A flame detector system includes an ultraviolet sensor to detect ultraviolet radiation, and a microcontroller coupled to the ultraviolet sensor. The microcontroller processes output from the ultraviolet sensor to identify a flame. The system can also include a HV supply circuit to constantly refresh a drive voltage of the sensor. The microcontroller can sense when the sensor discharges and thereupon immediately refresh the sensor. The microcontroller can also monitor a run time for the sensor and adjust a drive voltage for the sensor accordingly. Further, a background count can be monitored to determine the health of the sensor. A memory can also be provided to store data associated with the detector, and a communications module can communicate the data stored in the memory to an external device. The microcontroller calculates a filtered event count and compares the filtered event count to a threshold to determine if a flame is present.

5 Claims, 4 Drawing Sheets

U.S. PATENT DOCUMENTS

| | | |
|---|---|---|
| 4,623,788 A | 11/1986 | Kern et al. |
| 4,639,598 A | 1/1987 | Kern et al. |
| 4,639,605 A | 1/1987 | Seki et al. |
| 4,639,717 A | 1/1987 | De Meirsman |
| 4,647,776 A | 3/1987 | Kern et al. |
| 4,665,390 A | 5/1987 | Kern et al. |
| 4,691,196 A | 9/1987 | Kern et al. |
| 4,694,172 A | 9/1987 | Powell et al. |
| 4,701,624 A | 10/1987 | Kern et al. |
| 4,709,229 A | 11/1987 | Otsuka |
| 4,718,497 A | 1/1988 | Moore et al. |
| 4,719,973 A | 1/1988 | Allen et al. |
| 4,728,794 A | 3/1988 | Allen |
| 4,736,105 A | 4/1988 | Fonnesbeck |
| 4,742,236 A | 5/1988 | Kawakami et al. |
| 4,750,142 A | 6/1988 | Akiba et al. |
| 4,765,413 A | 8/1988 | Spector et al. |
| 4,769,775 A | 9/1988 | Kern et al. |
| 4,785,292 A | 11/1988 | Kern et al. |
| 4,800,285 A | 1/1989 | Akiba et al. |
| 4,823,114 A | 4/1989 | Gotisar |
| 4,835,525 A | 5/1989 | Egi et al. |
| 4,864,146 A | 9/1989 | Hodges et al. |
| 4,866,420 A | 9/1989 | Meyer, Jr. |
| 4,882,573 A | 11/1989 | Leonard et al. |
| 4,923,117 A | 5/1990 | Adams et al. |
| 4,955,806 A | 9/1990 | Grunden et al. |
| 4,975,683 A | 12/1990 | Parsons et al. |
| 4,988,884 A | 1/1991 | Dunbar et al. |
| 5,006,710 A | 4/1991 | Powell |
| 5,026,272 A | 6/1991 | Takahashi et al. |
| 5,049,063 A | 9/1991 | Kishida et al. |
| 5,073,769 A | 12/1991 | Kompelien |
| 5,077,550 A | 12/1991 | Cormier |
| 5,126,721 A | 6/1992 | Butcher et al. |
| 5,189,398 A | 2/1993 | Mizutani |
| 5,191,220 A | 3/1993 | Innes |
| 5,194,728 A | 3/1993 | Peterson |
| 5,227,640 A | 7/1993 | Nomura et al. |
| 5,236,328 A | 8/1993 | Tate et al. |
| 5,237,512 A | 8/1993 | Davidson |
| 5,240,018 A | 8/1993 | Clark et al. |
| 5,257,013 A | 10/1993 | Lewkowicz |
| 5,311,167 A | 5/1994 | Plimpton et al. |
| 5,339,070 A | 8/1994 | Yalowitz et al. |
| 5,365,223 A | 11/1994 | Sigafus |
| 5,389,790 A | 2/1995 | Honey et al. |
| 5,424,554 A | 6/1995 | Marran et al. |
| 5,495,112 A | 2/1996 | Maloney et al. |
| 5,510,772 A | 4/1996 | Lasenby |
| 5,548,277 A | 8/1996 | Wild |
| 5,561,290 A | 10/1996 | Strobel et al. |
| 5,594,421 A | 1/1997 | Thuillard |
| 5,612,537 A | 3/1997 | Maynard et al. |
| 5,625,342 A | 4/1997 | Hall et al. |
| 5,627,362 A | 5/1997 | Youngquist et al. |
| 5,677,532 A | 10/1997 | Duncan et al. |
| 5,691,703 A | 11/1997 | Roby et al. |
| 5,748,090 A | 5/1998 | Borg et al. |
| 5,775,895 A | 7/1998 | Fenn et al. |
| 5,796,342 A | 8/1998 | Panov |
| 5,798,946 A | 8/1998 | Khesin |
| 5,804,825 A | 9/1998 | Schuler |
| 5,838,242 A | 11/1998 | Marsden |
| 5,850,182 A | 12/1998 | Schuler |
| 5,914,489 A | 6/1999 | Baliga et al. |
| 5,959,301 A | 9/1999 | Warashina |
| 5,995,008 A | 11/1999 | King et al. |
| 6,013,919 A | 1/2000 | Schneider et al. |
| 6,024,561 A | 2/2000 | Kemp et al. |
| 6,060,719 A | 5/2000 | DiTucci et al. |
| 6,121,621 A | 9/2000 | Warashina et al. |
| 6,208,252 B1 | 3/2001 | Danilychev |
| 6,261,086 B1 | 7/2001 | Fu |
| 6,278,374 B1 | 8/2001 | Ganeshan |
| 6,329,921 B1 | 12/2001 | Tindall et al. |
| 6,346,712 B1 | 2/2002 | Popovic et al. |
| 6,348,871 B1 | 2/2002 | Tanguay et al. |
| 6,404,342 B1 | 6/2002 | Planer et al. |
| 6,486,486 B1 | 11/2002 | Haupenthal |
| 6,501,383 B1 | 12/2002 | Haupenthal |
| 6,507,023 B1 | 1/2003 | Parham et al. |
| 6,515,283 B1 | 2/2003 | Castleman et al. |
| RE38,234 E | 8/2003 | Warashina et al. |
| 2002/0021221 A1 | 2/2002 | Okamoto et al. |
| 2002/0089283 A1 | 7/2002 | Francke et al. |

OTHER PUBLICATIONS

"Handling and Operating Precautions for UV TRON®," Hamamatsu Photonics K.K., 2 pages (Aug. 1990).

"Technical Information. How to use UV TRON®," Hamamatsu Photonics K.K, 8 pages (Jan. 1991).

"Technical Information. UVtron® (Ultraviolet Detector Tube) Characteristics and Methods of Use," Hamamatsu Photonics K.K., pp. 1-15 (Jul. 1984).

"Technical Information. UVtron® (Ultraviolet Detector Tube) Characteristics and Methods of Use," Hamamatsu Photonics K.K., pp. 1-15 (Apr. 1986).

"UV TRON® Driving Circuit. C3704 Series. Compact, Lightweight, Low Current Consumption, Low Cost Operates as High Sensitivity UV Sensor with UV TRON Suitable for FLame Detectors and Fire Alarms," Hamamatsu Photonics K.K., 2 pages (Jul. 1997).

"UV TRON® Driving Circuit. C3704 User's Manual," Hamamatsu Photonics K.K., 4 pages (Feb. 1989).

"UVtron® (Ultraviolet Detector Tube) Characteristics and Methods of Use," Hamamatsu Photonics K.K, 4 pages (Apr. 1986).

International Search Report and Written Opinion mailed Dec. 11, 2006.

* cited by examiner

FLAME DETECTOR WITH UV SENSOR

RELATED APPLICATION

This application claims the benefit of U.S. Patent Provisional Application Ser. No. 60/569,102, filed May 7, 2004 and entitled "Flame Detector with UV Sensor," the entirety of which is hereby incorporated by reference.

TECHNICAL FIELD

The present invention relates to aspects of flame detector systems utilizing ultraviolet sensors.

BACKGROUND

Fire detector systems are available to sense various attributes of a fire and to warn individuals when a fire is detected. For example, smoke detectors include sensors adapted to sense smoke associated with a fire and to alarm when a sufficient amount of smoke is detected. Other detectors sense other attributes associated with a fire.

For example, flame detector systems utilizing ultraviolet ("UV") sensors are known. In a flame detector system, UV radiation emitted from the flames of a fire is detected by the detector's UV sensor. When a sufficient amount of UV radiation is detected, the flame detector system alarms to warn individuals of a flame.

However, there are challenges associated with using flame detector systems with UV sensors to sense flames. For example, UV radiation is emitted from many sources other than the flames of a fire. For instance, sunlight emits UV radiation. It can therefore be difficult to distinguish between UV radiation given off from a flame and other sources of UV radiation, such as sunlight, which do not require alarming. Consequently, the sensitivity of the flame detector systems, and how such systems are configured to process UV radiation, can be important to minimize false alarming while providing adequate protection in case of a fire.

Other challenges associated with this type of flame detector system involve the sensor used to detect the UV radiation. Typically, a UV sensor can be constructed of a sealed UV glass tube with a pair of electrodes and a reactive gas enclosed therein. A constant voltage is typically applied across the UV sensor in order to adequately sense UV radiation. In the presence of UV radiation of a certain wavelength (typically in the range of 100–300 nm), the sensor discharges the voltage to indicate detection of UV radiation. After the UV sensor discharges, the voltage across the sensor must be refreshed to allow the sensor to continue to detect UV radiation. Typically, once a UV sensor discharges, it is refreshed at a periodic interval.

The performance of the UV sensor is known to degrade over time. It can therefore be important to monitor the performance or "health" of the UV sensor to identify when performance of the sensor degrades.

It is therefore desirable to provide flame detector systems that overcome one or more of these challenges and provide additional benefits over prior flame detector systems.

SUMMARY

The present invention relates to aspects of flame detector systems utilizing ultraviolet sensors.

In one example embodiment according to the invention, a flame detector system includes an ultraviolet sensor configured to detect ultraviolet radiation, and a microcontroller coupled to the ultraviolet sensor. The microcontroller is configured to process output from the ultraviolet sensor to identify a flame.

In one embodiment, the system further includes a high voltage ("HV") supply circuit to constantly refresh a drive voltage of the ultraviolet sensor.

In another embodiment, the microcontroller is configured to sense when the ultraviolet sensor discharges and thereupon immediately refreshes the ultraviolet sensor.

In another embodiment, the microcontroller monitors a run time for the detector and adjusts a drive voltage for the ultraviolet sensor based on the run time.

In yet another embodiment, the microcontroller monitors a background count from the ultraviolet sensor, and the microcontroller initiates an error condition if the background count falls outside given parameters.

In another embodiment, the system includes a memory to store data associated with operation of the detector. In one embodiment, the system further includes a communications module configured to communicate the data stored in the memory to a device external to the detector.

In yet another embodiment, the microcontroller calculates a filtered event count and compares the filtered event count to a threshold to determine if a flame is present.

According to one aspect, a flame detector system includes an ultraviolet sensor configured to detect ultraviolet radiation, a microcontroller coupled to the ultraviolet sensor, the microcontroller being configured to process output from the ultraviolet sensor to identify a flame, and a HV supply circuit to constantly refresh a drive voltage of the ultraviolet sensor.

According to another aspect, a flame detector system includes an ultraviolet sensor configured to detect ultraviolet radiation, and a microcontroller coupled to the ultraviolet sensor, the microcontroller being configured to process output from the ultraviolet sensor to identify a flame. The microcontroller monitors a discharge event count for the ultraviolet sensor during a fixed window and calculates a filtered event count, and wherein the microcontroller compares the filtered event count to a threshold to determine if a flame is present, and the filtered event count is calculated according to the following equation: filtered event count= $((1-\text{Weighting Constant}) \times \text{FEC}_{previous}) + (\text{Weighting Constant} \times \text{Current Reading})$, wherein the $\text{FEC}_{previous}$ is a measure of previously accumulated discharge events from previous fixed windows, and the Current Reading is a number of discharge events measured in a most recent fixed window.

According to yet another aspect, a flame detector system includes an ultraviolet sensor configured to detect ultraviolet radiation, and a microcontroller coupled to the ultraviolet sensor, the microcontroller being configured to process output from the ultraviolet sensor to identify a flame. The microcontroller monitors a background count for the ultraviolet sensor and initiates an error condition if the background count falls outside a background threshold.

The above summary of the present invention is not intended to describe each disclosed embodiment or every implementation of the present invention. Figures and the detailed description that follow more particularly exemplify embodiments of the invention. While certain embodiments will be illustrated and describing embodiments of the invention, the invention is not limited to use in such embodiments.

BRIEF DESCRIPTION OF THE DRAWINGS

The invention may be more completely understood in consideration of the following detailed description of various embodiments of the invention in connection with the accompanying drawings, which are briefly described below.

While the invention is amenable to various modifications and alternative forms, specifics thereof have been shown by way of example and the drawings. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention relates to aspects of flame detector systems utilizing ultraviolet ("UV") sensors. Generally, the flame detector systems can be utilized to detect a flame and to alert individuals when a flame is detected. More specifically, the example flame detector systems include sensors used to detect UV radiation emitted by the flames of a fire, and the systems alarm when a sufficient amount of UV radiation is detected.

Figure 1:
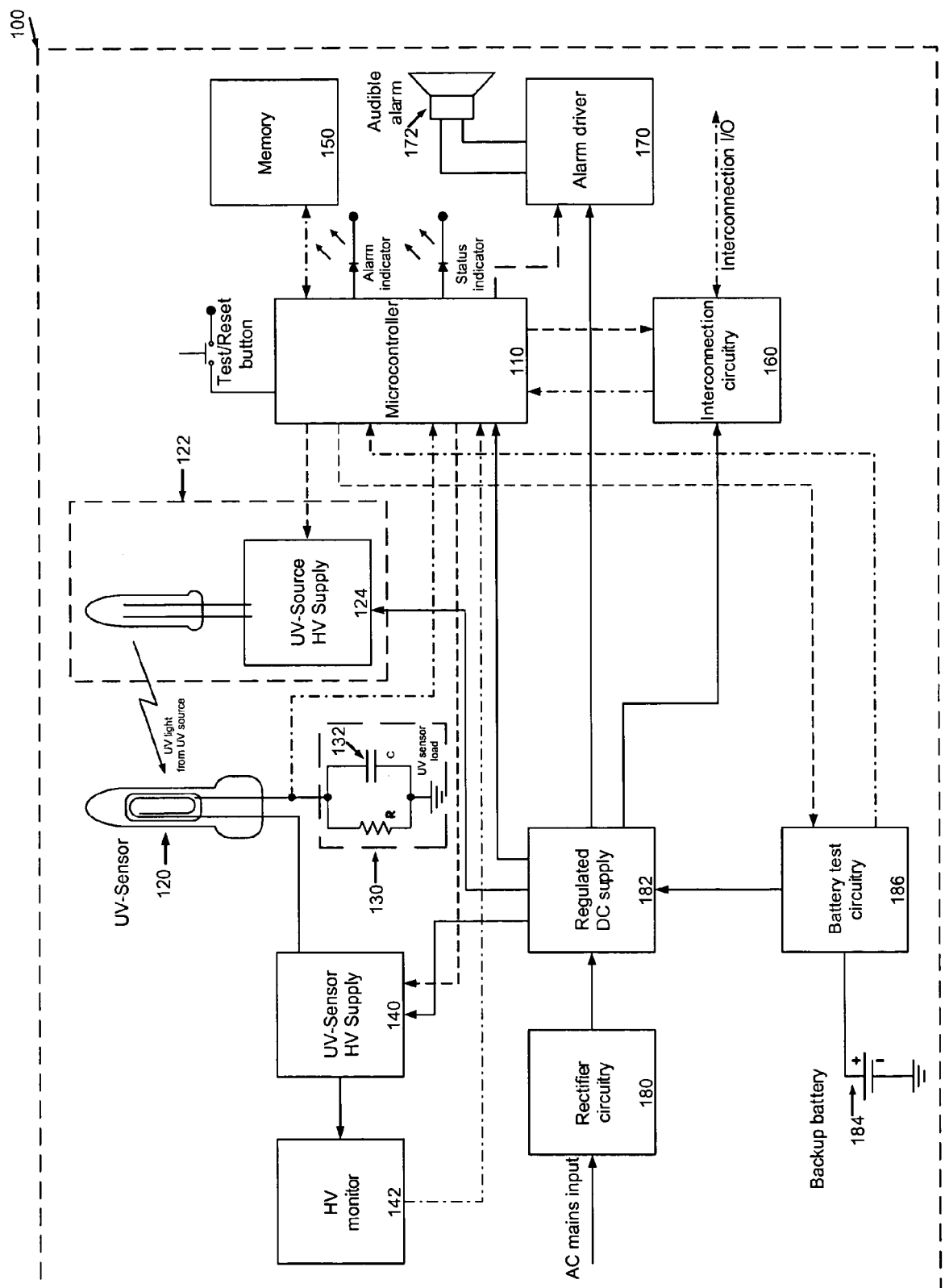
FIG. 1 is a schematic drawing of an embodiment of a flame detector made in accordance with principles of the present invention.

Referring now to FIG. 1, a schematic view of an example flame detector 100 is illustrated. Flame detector 100 includes a microcontroller 110, a UV sensor 120, and a sensor drive circuit 130. Also included are a HV supply circuit 140, a HV monitor 142, a memory 150, and a communications module 160.

Additional components of the flame detector 100 that are illustrated include a UV source 122, including a HV supply circuit 124, that can be used to test the sensor 120, and an alarm driver 170 and alarming device 172 (e.g., piezoelectric buzzer) for alarming when a flame is detected. Various components used to power the detector 100 are also illustrated, including a rectifier circuit 180 that is coupled to an alternating current source, and a battery 184 and battery test circuit 186. Both the rectifier circuit 180 and battery 184 are coupled to a regulated direct current supply 182, which provides power to various components of the flame detector 100.

Flame detector 100 detects UV radiation associated with flames of a fire using sensor 120, which is configured to detect UV radiation. The sensor 120 can be one of many sensors available to measure UV radiation. For example and without limitation, in one embodiment the sensor 120 is a UV-Tron R2868 sensor manufactured by Hamamatsu Photonics K.K. of Japan.

The sensor 120 is driven by a given voltage. In one example, the voltage is between 300–500 VDC. The sensor drive circuit 130 provides the necessary voltage across the sensor 120 through charging and discharging of a capacitor 132. The sensitivity of the sensor 120 is proportional to the drive voltage. It can therefore be advantageous to maintain the voltage across the sensor 120 at a constant level. However, typically there is a certain amount of voltage leakage associated with the sensor drive circuit 130. Therefore, it is necessary to refresh the drive voltage in order to maintain the voltage across the sensor 120 at the desired level.

When the sensor 120 senses UV radiation from a UV source (e.g., flame, sunlight, etc.), the sensor 120 discharges or fires, reducing the voltage across the sensor 120. When the sensor 120 discharges, this is referred to as a discharge event. A discharge event therefore signals the detection of ionizing radiation by the sensor 120. As ionizing radiation in the environment increases, the number of discharges by the sensor 120 increases, thereby indicating the increase in ionizing radiation.

Once the sensor 120 has discharged, the voltage across the sensor 120 must then be refreshed by the sensor driver circuit 130, and, once refreshed, the sensor 120 continues to sense UV radiation. It is typical for the sensor 120 to discharge multiple times when UV radiation is detected (i.e., record multiple discharge events), and the frequency of discharge (i.e., the number of recorded discharge events) increases as the intensity of the sensed UV radiation increases.

The HV monitor circuit 142 is coupled to the microcontroller 110 and functions to monitor the voltage across capacitor 132. The HV monitor circuit 142 is coupled to HV supply circuit 140, which is provided to refresh the drive voltage provided to the sensor 120 to compensate for any reduction in voltage. The HV monitor circuit 142 and the HV supply circuit 140 maintain the voltage at a desired level so that the sensor 120 can be refreshed as need to maintain the sensor 120 at the desired voltage (e.g., 300–500 VDC).

Output from the sensor 120 is sent to the microcontroller 110, which processes the sensor output. Based on the sensor output, the microcontroller 110 can determine aspects of the functioning of the detector 100, as well as the environment surrounding the detector 100. For example, based on the output of sensor 120, the microcontroller 110 can process a background count to determine the health of the UV sensor 120. See FIG. 4 for a discussion of the background count. In addition, the microcontroller 110 can determine if the output indicates the presence (or signature) of a flame by, for example, comparing a calculated filtered event count with a threshold. See FIGS. 2 and 3 for a discussion of the filtered event count.

If the microcontroller 110 determines that a flame has been detected (using one or more of the methods described below), an alarm such as alarm 172 is activated to provide audible or visual indication of the presence of the flame.

The microcontroller 110 is also configured to monitor the voltage across the sensor 120 and to immediately refresh the voltage upon discharge. In this manner, the sensor 120 can be quickly refreshed in preparation for sensing the next incidence of UV radiation.

In addition, in one embodiment, the microcontroller 110 monitors the period of time that the sensor 120 has been in use because the sensitivity of the sensor 120 to UV radiation can degrade over time. For example, the optimal firing voltage and current for the sensor 120 can vary as the time period the sensor has been in use increases. By monitoring this time period of use, the microcontroller 110 can vary one or more of the operating parameters for the sensor 120 (e.g., voltage, current) to optimize sensor sensitivity. For example and without limitation, assuming that the sensitivity of the sensor 120 increases over the time period of use (which may cause, for example, an increase in false indications of a fire), the microcontroller 110 can decrease the voltage across the sensor 120 over time to counteract the undesired increase in sensitivity.

The microcontroller 110 also monitors various aspects of the flame detector 100 and can identify when the detector 100 is malfunctioning. For example, the microcontroller 110 can store and output information associated with the function of the flame detector 100.

In one embodiment, the microcontroller 110 is further configured to store information regarding the functioning of the flame detector 100 in memory 150. The memory 150 can be any form of volatile or non-volatile memory including, for example and without limitation, RAM or ROM. In one embodiment, the memory 150 is a non-volatile memory in which information can be stored by the microcontroller 110 for a specified duration and, for example, through losses in power to the detector 100.

Figure 4:
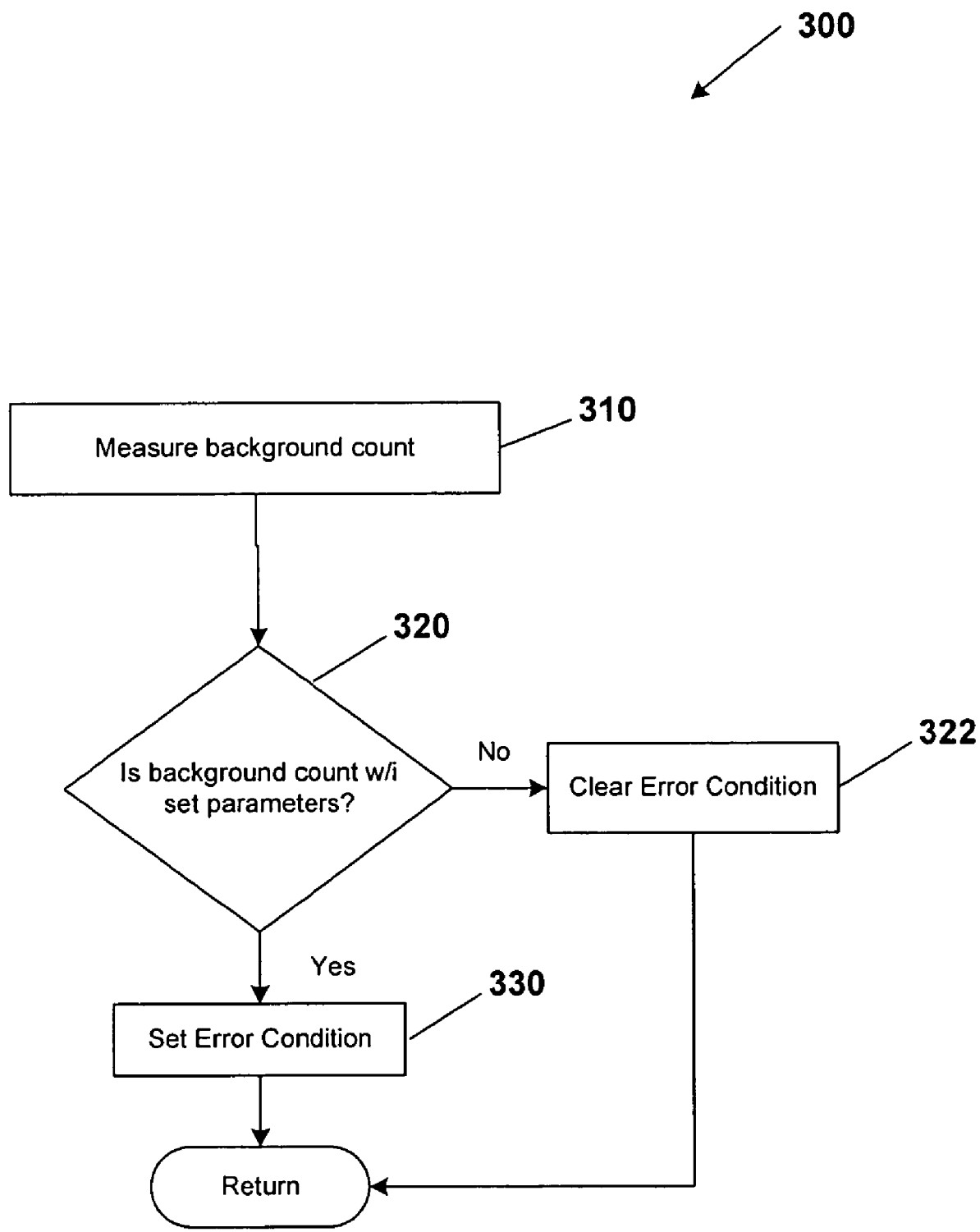
FIG. 4 is a flow diagram illustrating example operation of a flame detector including performance of example background count calculations in accordance with principles of the present invention.

For example and without limitation, the microcontroller 110 can store the following diagnostic information related to the operation of flame detector 100 in memory 150:
- number of times the unit has been tested by an individual;
- number of self-test failures;
- number of times that the unit has gone into alarm;
- information related to alarming, including longest alarm time and date of alarm; and
- history of background count information (see FIG. 4 for a description of the background count).

Other parameters associated with the detector 100 can also be measured and logged in memory 150. For example, currents and voltages at various circuit locations in detector 100 can be logged, as well as information related to the length of time the detector has been running and when certain other tests and/or alarms occurred. This list of the diagnostic information that can be stored in memory 150 is exemplary and not exhaustive.

In example embodiments, the microcontroller 110 can process the information stored in memory 150 to provide a historical trend for the operation of the detector 100. In addition, the information in memory 150 can be extract to a device external to the detector 100. For example, communications module 160 can be used to communicate information stored in memory 150 to an external device using a wired and/or wireless connection. In one embodiment, the communications module 160 communicates wirelessly with an external device to periodically upload information stored in memory 150 of the detector 100. The external device can, for instance, be a computer system utilized to further analyze the information from the memory 150 to, for example, measure performance and/or diagnose faults associated with the detector 100.

Although the example flame detector 100 has been illustrated with various components, variations in the number and type of components in detector 100 is possible. For example, various other components can be substituted for microcontroller 110 such as, for example and without limitation, a programmable logic device or other similar component.

Figure 2:
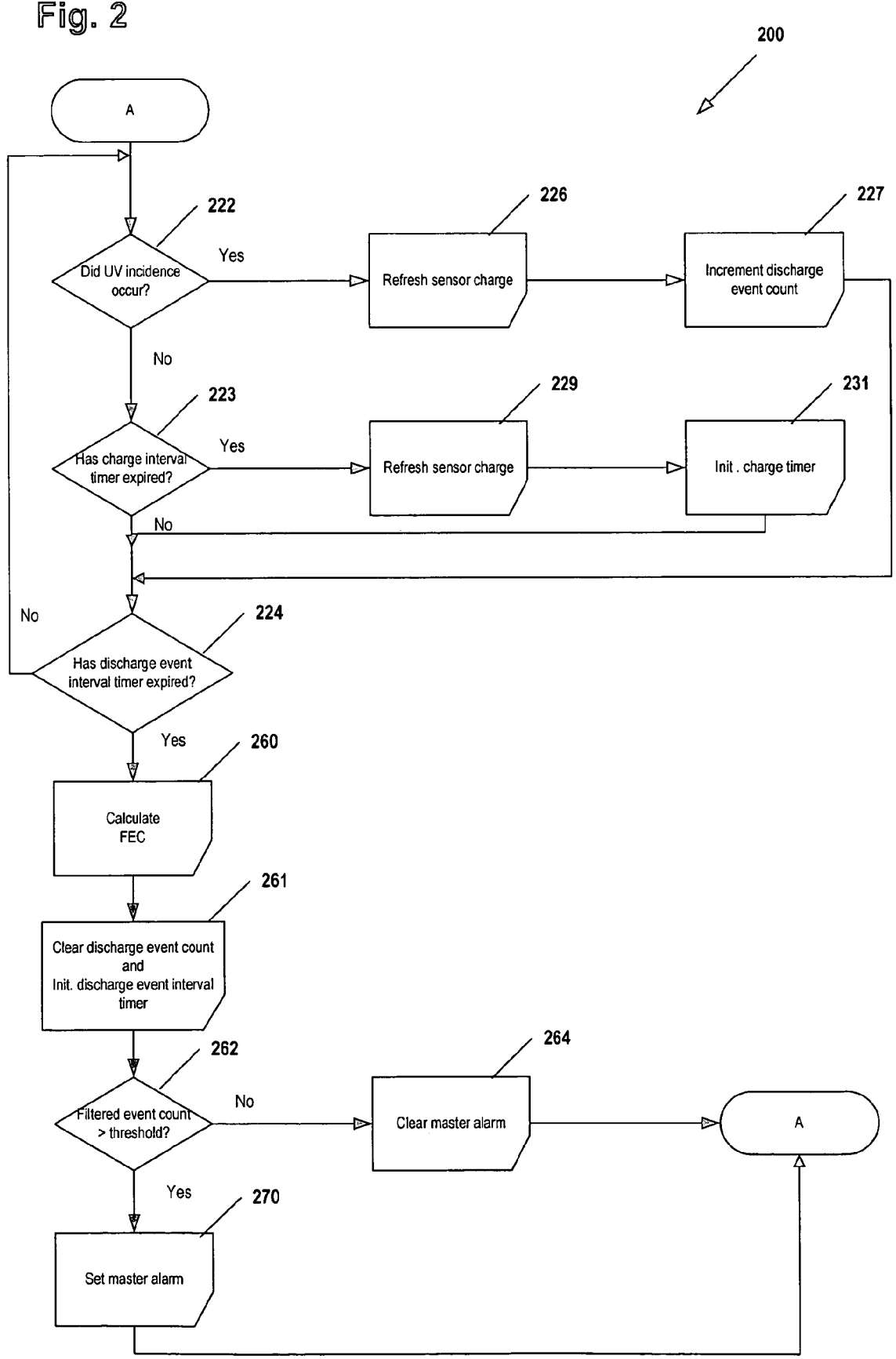
FIG. 2 is a flow diagram illustrating example operation of a flame detector in accordance with principles of the present invention.

Referring now to FIG. 2, an example flow diagram 200 illustrates one embodiment of the operational flow for the detector 100. Other operational flows can also be used, and the sequence of the operations in flow diagram 200 can be varied.

Referring to operation 222 of FIG. 2, the detector 100 measures UV incidences that are sensed by sensor 120. At operation 222, the microcontroller 110 determines if a UV incidence has occurred by, for example, monitoring the discharge of the sensor 120. If a discharge event has occurred, control is passed to operation 226 and sensor 120 is refreshed. Then, in operation 227, the discharge event count is incremented.

If a UV incidence has not been detected in operation 222, control is passed to operation 223, where it is determined whether a charge interval timer has expired. The charge interval timer measures the time between refreshes. In one example, the charge interval timer is set at a duration of between 150 ms and 500 ms. In one embodiment, the charge interval timer is set at 200 ms. If the charge interval timer has expired, control is passed to operation 229 and the UV sensor is refreshed. Next, control is passed to operation 231, wherein the charge interval timer is reset.

Next, control is passed from either operation 227 or 231 to operation 224, where it is determined whether a discharge event interval timer has expired. In example embodiments, the discharge event timer can be fixed or variable. In one embodiment, the duration is fixed and is therefore called a fixed window. For one example embodiment, the fixed window has a period between 100 and 300 ms, more preferably a 200 ms period. If the discharge event interval timer has not expired, control is passed back to operation 222.

If the discharge event interval timer has expired, control is passed to operation 260, where a filtered event count is calculated. Generally, in one example embodiment, the filtered event count is an accumulation of the number of discharge events measured in previous fixed windows and the most current fixed window. If the number of discharge events received during a given fixed window exceeds a threshold, the microcontroller 110 can trigger an alarm indication.

Figure 3:
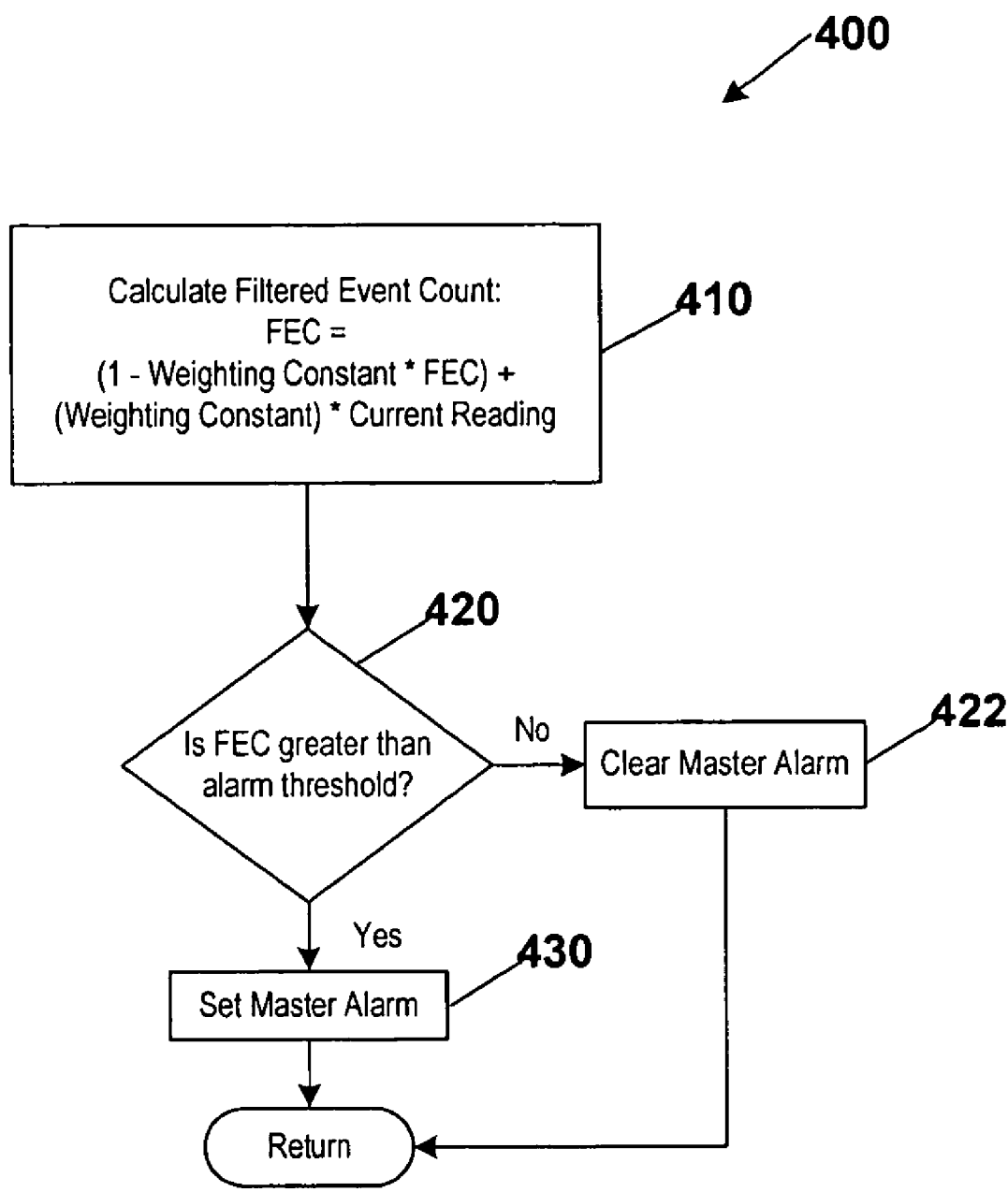
FIG. 3 is a flow diagram illustrating example operation of a flame detector including performance of example filtered event count calculations in accordance with principles of the present invention.

More specifically, one example method for calculating the filtered event count is provided in flow diagram 400 illustrated in FIG. 3. At operation 410, the following equation can be used to calculate a Filtered Event Count.

$$\text{Filtered Event Count(FEC)} = ((1 - \text{Weighting Constant}) \times \text{FEC}_{previous}) + (\text{Weighting Constant} \times \text{Current Reading})$$

The $\text{FEC}_{previous}$ is the previously calculated FEC, which is on all previous fixed windows. The $\text{FEC}_{previous}$ is set to zero upon initialization or reset of the detector 100. The Weighting Constant is a constant that can be adjusted as needed to adjust the sensitivity of the flame detector 100. In one example, the Weighting Constant is set at 0.1–0.3, preferably 0.2. The Current Reading is the number of discharge events measured in the most recent fixed window (i.e., the fixed window for which measurement have just completed). Therefore, with the Weighting Constant set at 0.2, the previous readings accumulated as the FEC are given a greater weight than the Current Reading, which represents the number of discharge events measured in the most recent fixed window.

The flow diagram 400 is called at the end of each fixed window (i.e., after each 200 ms period in the current design). The FEC is calculated and compared to a threshold at operation 420. In one embodiment, the threshold is set at 0.8–1.1, more preferably 1.0. If the FEC is greater than the threshold, the master alarm is set at operation 430. Otherwise, the master alarm status is cleared at operation 422, and monitoring of the next fixed window continues.

Because the Weighting Constant in the example is less than 1 (e.g., 0.2 in one embodiment), the discharge events of previous fixed windows (accumulated as the $\text{FEC}_{previous}$) are given greater weight in the equation than the Current Reading, which is the number of discharge events in the most recent fixed window. It can be advantageous to weight the accumulation of the discharge events of the previous fixed windows more highly than the most recent fixed window because it eliminates possibilities of spurious alarms.

Referring back to FIG. 2, in operation 261 the discharge event counter is cleared and the discharge event interval timer is reset. Next, in operation 262, if the FEC is less than the threshold, any master alarm is cleared at operation 264 and control is passed back to operation 222, where the flow 200 begins again. If the FEC is greater than the threshold, control is passed to operation 270, and the master alarm is set, and audible and/or visual warning of flame detection can be provided to warn individuals of the fire. Control is then passed back to operation 222 to allow the detector 100 to continue to monitor the UV events.

The example detectors described herein can be modified in various ways. For example, in one alternative embodiment, the parameters associated with the equation (e.g., length of fixed window, Weighting Constant, and threshold) can be manually or automatically adjusted to modify the sensitivity of the flame detector to allow the detector to be adapted to different environmental conditions. In one embodiment, automated modification is accomplished by the microcontroller 110, which evaluates the number of discharge events recorded from the sensor 120 and thereby automatically modifies processing of the discharge events. For example and without limitation, if the microcontroller senses that the FEC has been unusually high for an extended period of time, the microcontroller can modify the parameters of the equation, such as increasing the threshold, to make the detector less sensitive. In another embodiment, controls can be provided on the flame detector 100 to allow the user to modify one or more of the parameters to adjust the sensitivity of the flame detector.

In other embodiments, the filtered event count can be calculated in different manners. For example, in one alternative embodiment, the filtered event count can be calculated using a variable window, rather than a fixed window.

As illustrated in FIG. 4, in other embodiments a detector can be configured to measure a background count indicating the occasional incidence of other types of ionizing radiation (i.e., non-flame sources of UV radiation such as sunlight) that are detected by sensor 120. These incidences of ionizing radiation are not sufficient in magnitude and/or signature to cause the detector 100 to alarm. However, although the background count does not indicate the presence of a flame, it can be used as an indication of the health of the sensor 120. For example, as the sensor 120 becomes more sensitive over time to certain types of radiation such as sunlight, it can create an increase in background count. In other situations, if the performance of the sensor 120 has degraded due to malfunction, the sensor's sensitivity to UV radiation may decrease, thereby creating a decrease in background count.

By measuring this change in the number or frequency of the background count, the flame detector 100 can determine when abnormalities in sensor performance occur and provide an error indication for the user.

A flow 300 in FIG. 4 illustrates how the background count can be calculated and utilized to indicate sensor health. In operation 310, the background count is measured. Generally, the background count can be measured in various manners such as, for example and without limitation, accumulating the number of UV discharge events sensed by sensor 120 over a given period of time. In operation 320, the measured background count is compared to a set of parameters. For example and without limitation, in one embodiment of detector 100, a measured background count of between 4 to 20 UV events is expected within an interval of 200 ms. If the background count is within the given set of parameters (e.g., within 4 to 20 discharge events in a 200 ms period), any error indication is cleared. If the background count falls outside the given set of parameters (e.g., less than 4 or greater then 20 discharge events in a 200 ms period), an error condition is set.

The present invention should not be considered limited to the particular examples or materials described above, but rather should be understood to cover all aspect of the invention as fairly set out in the attached claims. Various modifications, equivalent processes, as well as numerous structures to which the present invention may be applicable will be readily apparent to those of skill in the art to which the present invention is directed upon review of the instant specification.

What is claimed is:

1. A flame detector system, comprising:
an ultraviolet sensor configured to detect ultraviolet radiation; and
a microcontroller coupled to the ultraviolet sensor, the microcontroller being configured to process output from the ultraviolet sensor to identify a flame;
wherein the microcontroller monitors a discharge event count for the ultraviolet sensor during a fixed window and calculates a filtered event count, and wherein the microcontroller compares the filtered event count to a threshold to determine if a flame is present; and
wherein the filtered event count is calculated according to the following equation:

$$\text{filtered event count} = ((1 - \text{Weighting Constant}) \times FEC_{previous}) + (\text{Weighting Constant} \times \text{Current Reading})$$

wherein:
the $FEC_{previous}$ is a measure of previously accumulated discharge events from previous fixed windows; and
the Current Reading is a number of discharge events measured in a most recent fixed window.

2. The system of claim 1, wherein the Weighting Constant is between 0.1 and 0.3.

3. The system of claim 1, wherein the threshold is between 0.8 and 1.1.

4. The system of claim 1, wherein a duration of the fixed window is between 100 ms and 300 ms.

5. The system of claim 1, wherein the microcontroller initiates an alarm condition if the filtered event count exceeds the threshold.

* * * * *